United States Patent
Benazzouz et al.

(10) Patent No.: US 10,867,254 B2
(45) Date of Patent: Dec. 15, 2020

(54) ADAPTING THE OPERATION OF AN APPLIANCE

(75) Inventors: Yazid Benazzouz, Valence (FR); Fano Ramparany, Grenoble (FR); Jérémie Gadeyne, Sainte Marie Cappel (FR); Philippe Beaune, Saint Genest Lerpt (FR)

(73) Assignee: ORANGE, Paris (FR)

( * ) Notice: Subject to any disclaimer, the term of this patent is extended or adjusted under 35 U.S.C. 154(b) by 466 days.

(21) Appl. No.: 13/807,491

(22) PCT Filed: Jun. 23, 2011

(86) PCT No.: PCT/FR2011/051440
§ 371 (c)(1),
(2), (4) Date: May 17, 2013

(87) PCT Pub. No.: WO2012/001271
PCT Pub. Date: Jan. 5, 2012

(65) Prior Publication Data
US 2013/0226849 A1    Aug. 29, 2013

(30) Foreign Application Priority Data
Jun. 29, 2010    (FR) .................................... 10 55210

(51) Int. Cl.
*G06N 20/00* (2019.01)
*H04L 12/28* (2006.01)
*G05B 15/02* (2006.01)

(52) U.S. Cl.
CPC .............. *G06N 20/00* (2019.01); *G05B 15/02* (2013.01); *H04L 12/2829* (2013.01); *G05B 2219/2642* (2013.01)

(58) Field of Classification Search
CPC .......... G06N 5/02; G06N 7/005; G06N 5/025; G06N 5/04; H04L 12/2827; H04L 12/2829; G05B 2219/2642
See application file for complete search history.

(56) References Cited

U.S. PATENT DOCUMENTS

| 6,263,260 B1 | 7/2001 | Bodmer et al. | |
| 7,792,770 B1* | 9/2010 | Phoha | G06N 99/005 706/45 |
| 8,442,812 B2* | 5/2013 | Ehsani | G06F 17/2775 704/231 |

(Continued)

FOREIGN PATENT DOCUMENTS

WO    WO 2010/037950 A1    4/2010

OTHER PUBLICATIONS

Doumit et al, Self-Organized Criticality and Stochastic Learning Based Intrusion Detection System for Wireless Sensor Networks, 2004.*

(Continued)

*Primary Examiner* — Li B. Zhen
*Assistant Examiner* — Mikayla Chubb
(74) *Attorney, Agent, or Firm* — Faegre Drinker Biddle & Reath LLP

(57) ABSTRACT

A method for adapting the operation of an apparatus connected to a network deployed in an environment, including the steps of: collecting data relating to the environment from a plurality of sources; identifying usual environmental situations from an analysis of the collected data; detecting a deviation from at least one identified usual situation; and sending a control to the apparatus for adapting the operation thereof to the detected deviation.

7 Claims, 2 Drawing Sheets

(56) References Cited

U.S. PATENT DOCUMENTS

| | | | | |
|---|---|---|---|---|
| 8,972,325 B2* | 3/2015 | Varghese | ............... | G06Q 30/02 |
| | | | | 706/47 |
| 2006/0155398 A1* | 7/2006 | Hoffberg | ............... | G05B 15/02 |
| | | | | 700/86 |
| 2007/0179761 A1* | 8/2007 | Wren | ............... | G06K 9/00771 |
| | | | | 703/2 |
| 2008/0208527 A1* | 8/2008 | Kavaklioglu | ........ | C10G 11/187 |
| | | | | 702/179 |
| 2009/0293121 A1* | 11/2009 | Bigus | ............... | G06F 21/316 |
| | | | | 726/22 |
| 2009/0318779 A1* | 12/2009 | Tran | ............... | 600/301 |
| 2010/0161149 A1* | 6/2010 | Nguyen | ............... | G06F 1/266 |
| | | | | 700/296 |

OTHER PUBLICATIONS

Ezeife et al, WIDS: A Sensor-Based Online Mining Wireless Intrusion Detection System, 2008.*
Khanna et al, System Approach to Intrusion Detection Using Hidden Markov Model, 2006.*
Rahman et al, WiFi Miner: An Online Apriori-Infrequent Based Wireless Intrusion Detection System, 2008.*
Gong et al, Data processing for real-time construction site spatial modeling (Year: 2008).*
Teizer et al, Real-Time Three-Dimensional Occupancy Grid Modeling for the Detection and Tracking of Construction Resources (Year: 2007).*
Gullo et al, A time series representation model for accurate and fast similarity detection (Year: 2009).*
Park et al., "A Steward Robot for Human-Friendly Human-Machine Interaction in a Smart House Environment," IEEE Transactions on Automation Science and Engineering, IEEE Service Center, New York, NY, US, vol. 5(1), pp. 21-25 (Jan. 1, 2008).
Rashidi et al., "Keeping the Resident in the Loop: Adapting the Smart Home to the User," IEEE Transactions on Systems, Man, and Cybernetics—Part A: Systems and Humans, IEEE Service Center, Piscataway, NJ, US, vol. 39(5), pp. 949-959 (Sep. 1, 2009).

* cited by examiner

ADAPTING THE OPERATION OF AN APPLIANCE

CROSS-REFERENCE TO RELATED APPLICATIONS

This application is the U.S. national phase of the International Patent Application No. PCT/FR2011/051440 filed Jun. 23, 2011, which claims the benefit of French Application No. 1055210 filed Jun. 29, 2010, the entire content of which is incorporated herein by reference.

FIELD

The present invention relates to adapting the operation of an appliance connected to a network deployed in an environment, in particular when in an unusual situation.

The invention applies advantageously, but in non-limiting manner, to the field of telecommunications services, and more particularly to home automation, building automation, and intelligent "smart city" services.

BACKGROUND

There presently exists on the market a home automation system that proposes learning the habits of a user of electrical appliances in order to automate the switching on or off of electrical appliances, e.g. in a dwelling. The user of such a situation can act on parameters for configuring and controlling the appliances either locally or via the Internet using a software interface. By taking this data into account, the home automation system learns which actions are appropriate on the basis of user inputs is such a manner as to automate such actions, relating in particular to sending warning messages to the user. By way of example, the system learns that in certain situations that have been predefined by the user and that are detected by the sensors deployed in the dwelling, it is appropriate to send a warning, e.g. by an email or an SMS message.

Nevertheless, that system is not capable, without any intervention by the user, of detecting situations to which it is necessary to respond by adapting the operation of one or more appliances. In that existing home automation system, situations and services provided by the appliances deployed in the dwelling are associated by predefined rules that can be adapted by the user via a software interface and by making use of learning based on the modifications made by the user.

SUMMARY

The present invention seeks to improve the situation.

To this end, the present invention firstly provides a method of adapting the operation of an appliance connected to a network deployed in an environment.

The method comprises the following steps implemented by a central element:
  collecting data relating to the environment and coming from a plurality of sources;
  identifying regular situations of the environment on the basis of an analysis of the collected data;
  detecting deviation from at least one identified regular situation; and
  sending a command to the appliance to cause it to adapt its operations to the detected deviation.

Thus, the invention allows the operation of an appliance to be adapted depending on the history of its use, on the basis of an analysis of data relating to the environment and coming from the various sources, without that requiring any intervention by the user. After detecting a deviation from a regular situation of the environment, the method of the invention makes it possible to send a command automatically to the appliance in order to cause it to adapt its operation.

Thus, the present invention makes it possible to solve the problem associated with adapting the operation of appliances deployed in an environment, e.g. a building or a dwelling, to the situations of that environment, and to do so in a manner that is automatic and without user intervention.

In one implementation, the sources comprise sensors deployed in the environment, and/or local and/or remote services, and/or local and/or remote applications. All of the data that might be pertinent in evaluating the situations of the environment is thus taken into account regardless of its source.

Advantageously, the collected data is represented using a single model. Representing data from different sources in a single data model thus makes it possible for data coming from different sources to be processed in generic manner. For example, the model is based on a semantic web language.

In an implementation, the step of identifying regular situations of the environment uses a data clustering technique. This technique presents the advantage of being capable of analyzing data that is collected in non-supervised manner. For example, the technique may use the so-called "k-means" algorithm or an expectation maximization (EM) algorithm, or a Markov cluster algorithm (MCK).

In this clustering technique, a regular situation is represented by the center situation, i.e. the centroid situation of each cluster. This situation is thus considered as being the situation that is representative of the cluster.

Advantageously, the above-mentioned method comprises a step of matching identified regular situations with the above-mentioned appliance. This matching makes it possible to determine which appliances in the environment and which services associated with those appliances are concerned by each identified regular situation.

In an implementation, the step of detecting deviation includes a substep of comparing collected data with regular situation data and relative to at least one threshold. This makes it possible to act in real time to compare the present situation of the environment with identified regular situations, the present situation comprising all of the data collected from the various sources at the time of the comparison.

The use of such a threshold makes it possible to have a margin for distinguishing between genuine deviations and small departures from regular situations.

In an implementation, the adaptation method further comprises:
  a step of receiving modification data from a user for modifying the adaptation command; and
  a step of correcting identified regular situations after receiving modification data.

Thus, any user reaction is indeed taken into account by the adaptation method.

Advantageously, the adaptation method further comprises a prior step of self-configuring the central element and the sources. Thus, there is no need for the user to perform any configuration in order to enable the method to operate.

By way of example, on initial installation in a particular environment such as a dwelling, the central element and the sources self-configure so as to adapt automatically to this particular environment. Similarly, after a source has been changed for a new source, there is no need for user intervention to ensure that the adaptation method of the invention operates correctly.

All of the above-described variants of the method may be present in isolation or in any technically feasible combination.

The invention also provides a system for adapting the operation of an appliance connected to a network deployed in an environment, said system comprising a central element and a plurality of sources. The central element is then adapted to implement the steps of the above-mentioned adaptation method.

The present invention also provides a computer program including instructions for implementing the above-mentioned adaptation method when the program is executed by a processor. By way of example, FIG. 2 (described below) may correspond to a flow chart representing the general algorithm of such a program.

BRIEF DESCRIPTION OF THE DRAWINGS

Other characteristics and advantages of the invention appear on examining the following detailed description and the accompanying drawings, in which.

DETAILED DESCRIPTION

Figure 1:
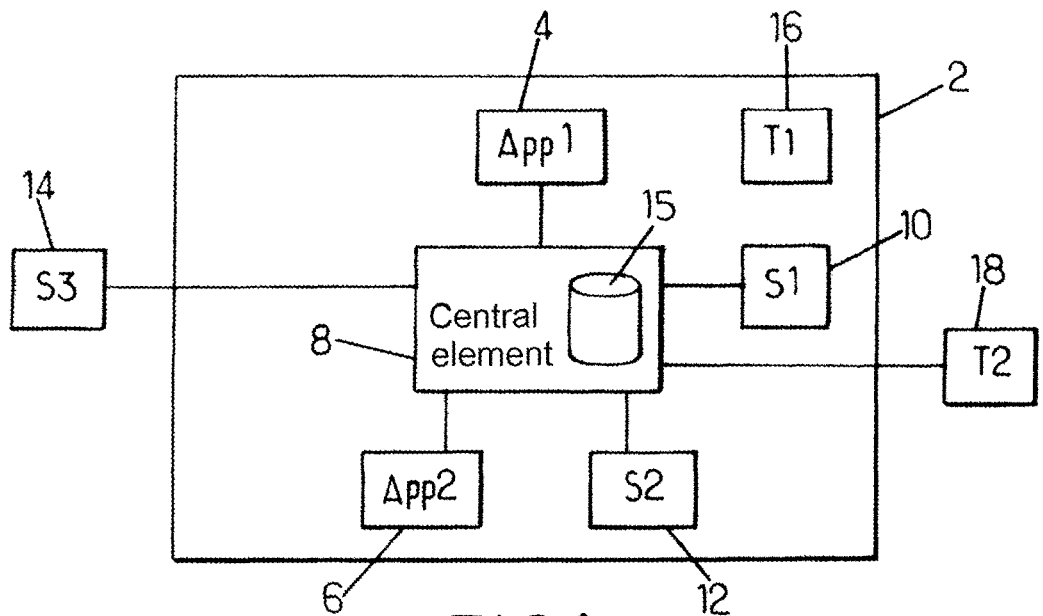
FIG. 1 is a summary diagram showing the structure of an adaptation system of the invention.

FIG. 1 shows an environment 2 such as a dwelling or a building. By way of example, the environment 2 constitutes a place where a user lives or works, the user visiting it regularly, e.g. daily, with appliances 4, 6 such as light bulbs, automatically opening doors and/or shutters, cooking appliances, radiators, etc.

According to the invention, an appliance may be used in various ways. For example, a light bulb may be switched on, switched off, or indeed its brightness may be increased or dimmed.

The appliances 4, 6 are connected as a network by means of systems comprising a central element 8 and sources 10, 12, 14 connected to the central element 8 by the network. For example, the sources 10, 12, 14 are connected to the central element 8 via information transmission connections of the wired type, such as, for example: a coaxial connection or an optical connection; or of the wireless type, such as, for example: a WiFi, Bluetooth, Zigbee, etc. connection.

By way of example, the central element 8 is a home automation box (HAB). It is associated with a data storage module 15.

By way of example, the sources 10, 12, 14 comprise sensors deployed in the environment 2, and/or local and/or remote web services, and/or local and/or remote applications.

Example sensors are infrared presence sensors, temperature sensors, etc., for example.

By way of example, a remote web service is a remote medical database suitable for sending health data concerning the user, a web weather service, etc.

By way of example, a remote application is an office responder indicating that the user is present at the work place, a video conference application, a mail management application, etc.

In addition, the user has terminals 16, 18 enabling the user to communicate with the central element 8 via a wireless network, e.g. a 3G network or a WiFi network, or indeed an IP network, e.g. the Internet. By way of example, such terminals 16, 18 comprise a cell phone and/or a computer and/or a WiFi tablet.

Figure 2:
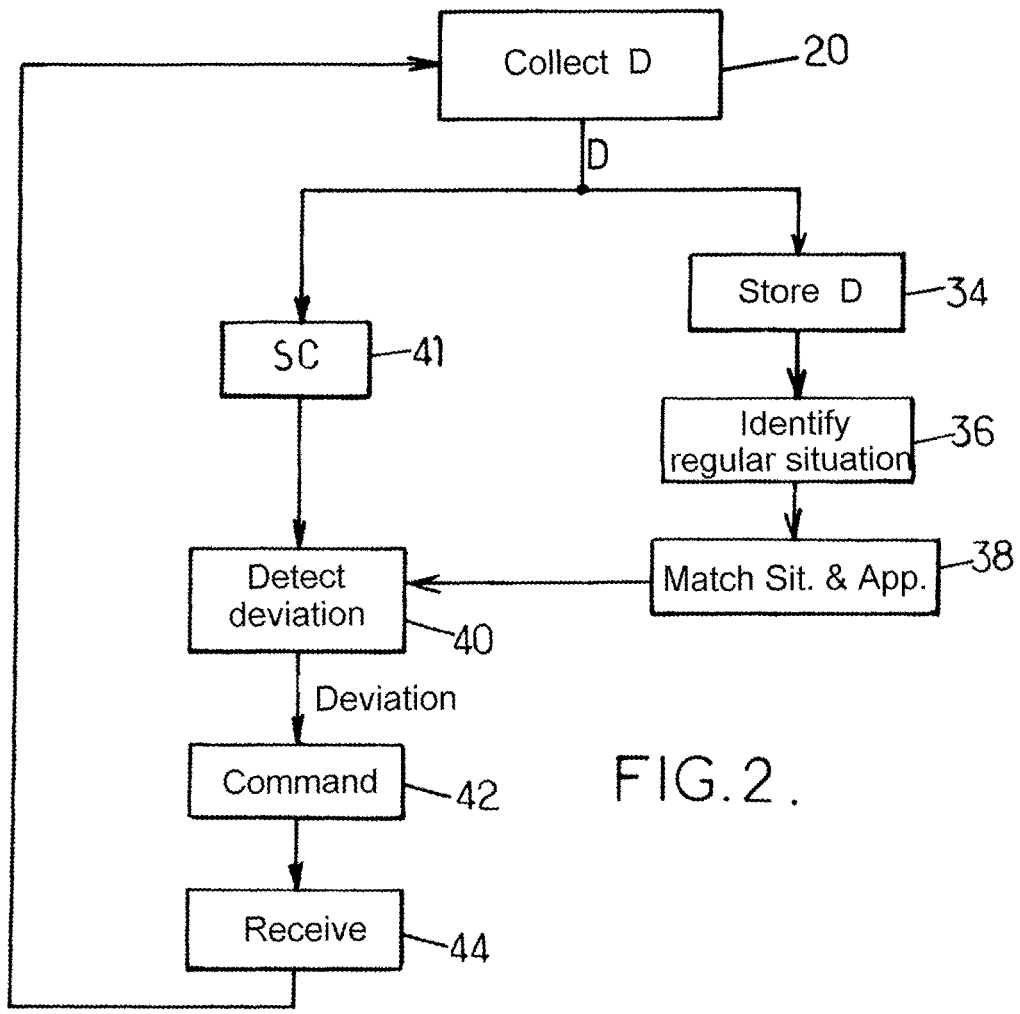
FIG. 2 is a flow chart showing the operation of an adaptation method of the invention.

The flow chart of FIG. 2 shows the operation of the adaptation method for adapting any one of the appliances among the appliances 4, 6 used in the environment 2.

In step 20 of FIG. 2, the central element 8 collects data relating to the environment from the various sources 10, 12, 14.

Advantageously, the collected data is transferred regularly to a remote database. This makes it possible to avoid collected data being lost, e.g. when locally stored data is destroyed or lost. Furthermore, this option means that there is no need to have a large amount of storage space in the central element. By way of example, the selected remote database is situated on the premises of the operator to enable certain types of processing to be performed on the collected data.

The acquired data is represented using a single data model. In an implementation, the model is based on a semantic web language, e.g. the resource description framework (RDF) language or indeed the web ontology language (OWL).

The RDF language is described in particular by Graham Klyne, Jeremy J. Carroll in: "Resource description framework (RDF), concepts and abstract syntax", W3C Recommendation, Feb. 10, 2004.

OWL is described in particular by: Michael K. Smith, Chris Welty, Deborah L. McGuinness in: "OWL web ontology language guide", W3C Recommendation, Feb. 10, 2004.

This type of model based on a semantic web language makes it possible to have a common data format for data coming from sources that are different and varied. It also makes it possible to give detailed meaning to raw data. For example, a raw data value of 15 might specify the temperature in the kitchen at 10:00 AM. This value is given by a temperature sensor t1 with confidence of 90%.

This type of model also makes it possible to have the same meanings for concepts used in the environment. For example, do5 and do6 designate doors. This type of model thus makes it possible to represent the data in standardized manner and also makes it possible to create links between data items in order to make the data easier to cluster.

Figure 3:
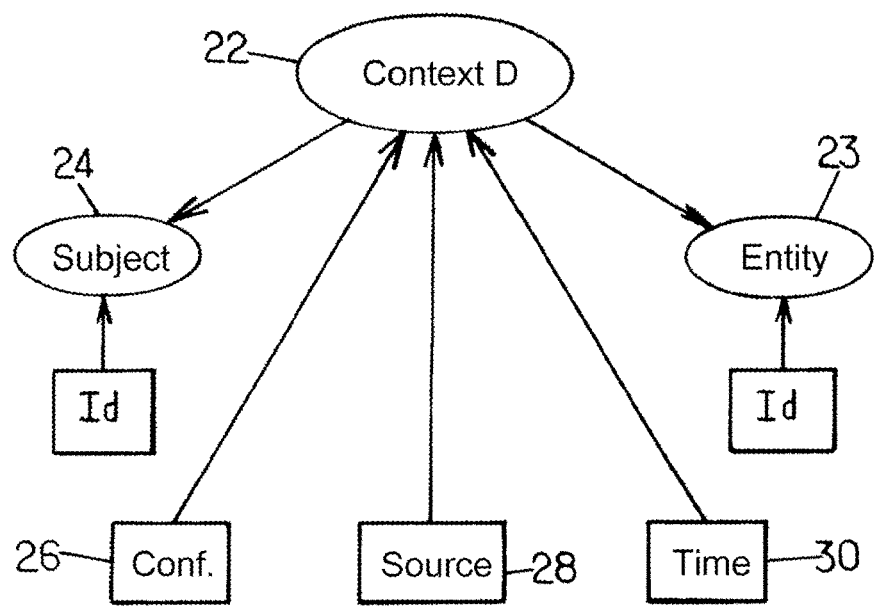
FIG. 3 is a summary diagram in the form of a graphical representation of a data model in a variant implementation of the invention.

By way of example, FIG. 3 is a graphical representation of a data model based on the RDF language of the W3C web consortium.

In that language, data acquired from a source 10, 12, 14 that may be arbitrary, comprises:
  a root node that represents context data 22. This is an identifier of the data;
  an entity 23. This is the entity to which the data relates. By way of example, this entity may be a person, an object, or a concept. The entity 23 is identified by an identifier. For example, a person entity having the identifier "John", a "light bulb" object having the identifier "LB1", a "vol" concept having the identifier "TV-vol";
  a subject 24 that defines the subject relating to the entity 23. The subject 24 has an identifier. As examples of subject 24, mention may be made of the "location" having the identifier "kitchen" and relating to the entity "person", or indeed the subject "state" having the identifier "on" and relating to the entity "light bulb", or indeed the subject "level" having the identifier "5" and relating to the entity "vol";

a confidence index 26 given to the data. For example, the source that sends the data gives the data a confidence value on the basis of internal characteristics or of characteristics defined by the manufacturer of the source. For example, an infrared sensor detects presence with 90% confidence;

a source 28, which is the source 10, 12, or 14 from which the data was collected, e.g. an infrared sensor when the subject 24 is the presence of a person; and a timestamp 30 giving the instant at which the data was issued.

During the data collection of step 20 in FIG. 2, the sources 10, 12, 14 communicate with the storage module 15 via a software interface in a subscription mode. In this mode, only changes are stored in the storage module 15 in a step 34. The old value of each data item thus remains valid so long as there is no new value for that data.

In an implementation of the invention, the collected data is stored in a database of the storage module 15, the database being of the My Structured Query Language (MySQL) type as described in the 2005 work by Michel Kofler in: "MySQL 5: guide de l'administrateur et du développeur" [MySQL 5: administrator's and developer's guide], ISBN 2 212 116330.

In step 36 of FIG. 2, the central element 8 analyzes the collected data to identify regular situations of the environment 2.

A regular situation may relate to the user or to the user's environment 2. A distinction is thus made between regular situations concerning the use of an appliance 4, 6 and regular situations concerning the life of the user.

A "regular" situation of the environment is a combination of uses of electrical appliances in the environment and of context information values relating to the same environment such as the presence of the user in the environment, the time of day, etc.

An example of a regular use situation is the fact that, each morning, the user rolls up the shutters and each evening rolls them down, or the fact that the user locks the door before leaving for work in the morning, or the fact that the user never leaves his/her cell phone at home when going out, or always sets the TV volume to level 5 when watching a music channel on the TV, or indeed that the user always lowers the volume level of the TV when answering a telephone call, etc.

An example of such a regular life situation is the fact the appliances in the environment 2 always consume energy in the range 5 kilowatts (kW) to 10 kW when the user is at work or the fact that smoke is detected in the environment 2 only at meal times.

In an implementation of the invention, the data analysis used for identifying regular situations is based on a data clustering technique, e.g. by using the so-called "k-means" algorithm or by using a variant of the Markov cluster algorithm (MCK) that makes it possible to determine natural clusters in graphs.

The k-means data clustering technique is described in the (1975) work by J. A. Hartigan: Clustering algorithms", Wiley, MR0405726, ISBN 0-471-35645-X.

The MCK algorithm is described by B. Samuel Lattimore, Stijn van Dongen, and M. James C. Crabbe in: "GeneMCL in microarray analysis", Journal of Computational Biology and Chemistry, Vol. 29, No. 5, pp. 354-359, 2005.

Data coming from different sources at an instant t constitutes a situation. Changing at least one value in this data is considered as a change of situation. Situations over time are compared and grouped together, e.g. using the variant of the MCK clustering algorithm. This algorithm makes use of similarity measurements of the term frequency-inverse document frequency (tf-idf) type, similarity measurements of the relational type serving to compare data on the basis of relationships existing between the concepts of a graph and conceptual measurements serving to compare concepts on the basis of how close together they are in a system for representing knowledge relating to a situation, otherwise known as "ontology". Each cluster that is obtained by the algorithm then corresponds to a regular situation. In other words, the centroid situation for each cluster that is obtained represents a regular situation.

By way of example, when the environment 2 is a dwelling, the step 36 of identifying regular situations may be performed at night while the user is asleep.

In step 38 of FIG. 2, identified regular situations are matched with one or more uses of one or more appliances.

This matching serves to determine the appliances of the environment and the services associated with these appliances that are concerned by each identified regular situation. By way of example, for the regular situation: "the user never leaves his/her cell phone at home when going out", the appliance in question is the cell phone and the service concerned is the warning service. Thus, on the user closing the door, an alarm on the door is triggered indicating that an object has been forgotten by using a particular color backed up by a display showing the forgotten object.

In an implementation, when the clustering algorithm has been used for identification in step 36, if such a regular situation representative of the cluster corresponds to one or more uses of one or more appliances in the environment 2, then the regular situation and the uses of the corresponding appliance(s) are saved for subsequent use.

The matching in step 38 is performed by analyzing the data constituting each identified regular situation. Each of these data items is matched with a description of services relating to the appliances and of the effects of the services or the uses of the appliances in an ontology of the environment 2, by making a query to the ontology.

The ontology thus serves to calculate conceptual and relational similarities and to match appliances and services with regular situations of the environment.

Figure 4:
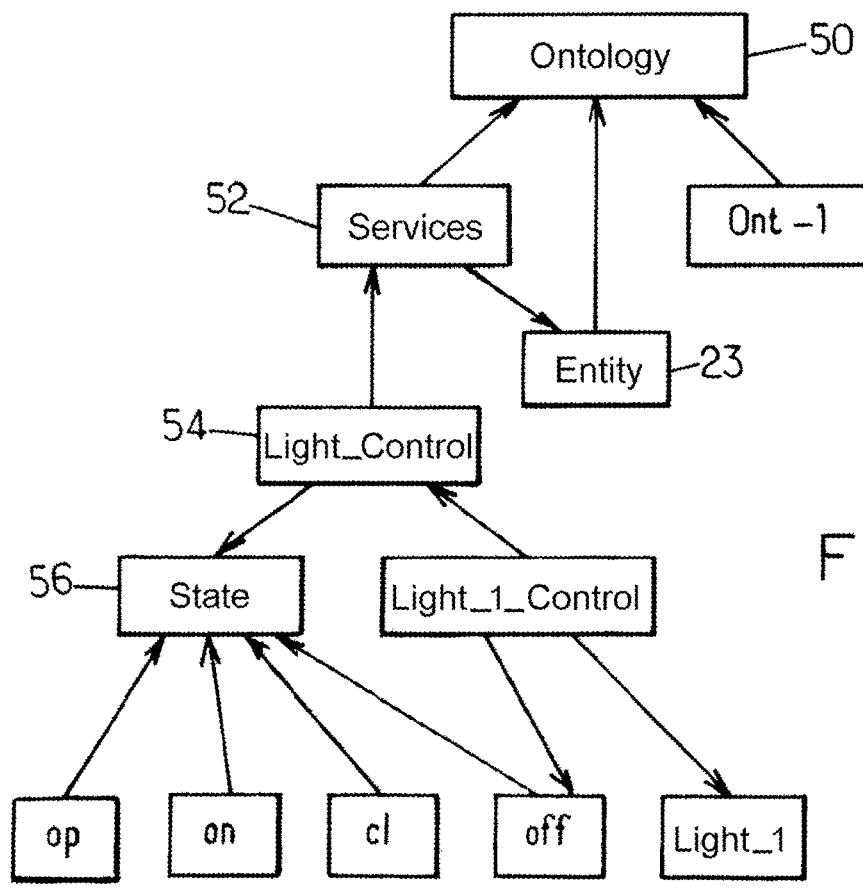
FIG. 4 is a summary diagram in the form of a graphical representation of an example environment ontology.

FIG. 4 shows a data item describing a Light_1 that is off and assumed to form part of a regular situation being matched with a particular use of the light Light_1.

In FIG. 4, the ontology 50 describes the data coming from various entities 23 and the services 52 supplied in the environment. These services include the "light_control" service 54 acting on the state 56 of the light.

The data item "light 1 off" is shown in the model of FIG. 3. In this model, the two values of the data item, i.e. the entity or Light_1 and the context "off" are analyzed in order to verify whether the regular situation corresponds to an appliance being used as shown by the query expressed in the SPARQL query language (described in Eric Prud'hommeaux, Andy Seaborne: "SPARQL query language for RDF", W3C Recommendation, Jan. 15, 2008):

PREFIX base: <http://www.owlontologies.com/Context-DataOntology.owl#>
SELECT ?service
WHERE (?servicebase:hasEffect base:off.
?service base:hasActionOn base:Light_1)

The response to this query is the service for controlling the appliance Light_1: light_1_control.

In step 40, the central element 8 acts in real time to detect whether a current situation SC 41 of the environment and corresponding to the current data collected from the sources 10, 12, 14 has drifted from at least one regular situation SP identified in step 36.

To this end, the central element 8 acts in real time to compare the collected data with the data of regular situations identified in terms of at least one threshold.

In one implementation, the thresholds relate to the values of the timestamp 30 or the confidence index 26 and/or the values that can be taken by a subject 24.

As an example of such deviation, in the current situation, the collected data shows that a light is on whereas in the regular situation, that light is off. The threshold for comparing the two data items corresponding to the current situation and to the regular situation may for example be two minutes in terms of the timestamp.

An example of a pseudo-algorithm for detecting such a deviation is as follows:

For each data item of the current situation (SC) and
For each data item belonging to the regular situation (SP)
If the context data of SP and of SC comes from the same source S, do
  Compare SP and SC at end threshold (Sei)
  If similar, mark the data item in SP and the data item in SC
  Go to the following situation SP;
  Go to the following situation SC.
If at least two data items are not similar, then it is considered there is no deviation.
If only one divergence (only one non-similarity for two data items coming from the same source) is found, then verify whether it corresponds to the same appliance.
  If so then there is deviation.
End.

In step 42, the central element 8 sends a command to the appliance in question to cause it to adapt its operation to the detected deviation. More particularly, the command is sent by using a format available in the radio protocols deployed in the environment, e.g. ZigBee, WiFi, Bluetooth, etc., or by using a high level command language, e.g. web services description language/simple object access protocol (WSDL/SOAP).

In an implementation relating merely to "on/off" type actuation of the appliance, a simple format command is used, e.g. using the ZigBee protocol.

For a command that is more complicated, a WSDL/SOAP language description is used, for example, in order to control a network attached storage (NAS) disk and manipulate its multimedia content.

In another implementation of the invention, a warning message is sent to the user with the help of an SMS message using a 3G network or else using email via an Internet type network.

An example of use of the method of the invention is as follows. The environment is a dwelling and a regular situation in this environment is the fact that on working days of the week the user switches off all appliances before going to work. The energy consumption of the environment is then 50 watt hours (Wh). Exceptionally, one day, the user is late. The user leaves hurriedly without switching off the various appliances in the dwelling, e.g. the hot plate of the cooker and the light bulb in the bedroom, and the user leaves the refrigerator door open. Presence sensors and door sensors deployed in the habitat indicate this deviation from the regular situation.

The system of the invention then also detects high energy consumption compared with the normal consumption. It identifies the appliances responsible for this high consumption, in particular the hot plate of the cooker and the bedroom light bulb, and it adapts the operation of those appliances by switching them off.

Concerning the refrigerator door, the system of the invention issues a warning that it sends as an SMS message using the 3G network or as an email using the Internet.

In an implementation of the invention, the adaptation method includes a step 44 of receiving data concerning modification of the command by the user.

Such a modification may consist in canceling the user's command of the appliance. When the command is a warning sent to the user, the modification may for example be the fact that the user ignores the warning because the user judges the deviation to be of no importance.

Under such circumstances, the central element relaunches the method of identifying regular situations in order to take the user's reaction into account.

By way of example, the user always sets the volume of the TV to level 5 when the user, in the living room, is watching a particular television channel, e.g. a music channel. When a deviation is detected, e.g. the volume is at level 2 under the same conditions (same particular channel, user in the living room), the volume of the TV is corrected to level 5. If the user corrects that adaptation by returning the volume to level 2, because the user is reading a document, the system corrects itself by considering in this example that the user does not set the TV volume to level 5 while reading a document. Thus, the system takes this new data item into account, namely reading a document while watching the music channel, in the step of identifying regular situations.

In a particular implementation, in order to detect a user modification, the central element 8 defines a time interval tc that corresponds to the minimum time allowed to the user for reacting to the command. Thereafter, it acts in real time to compare the situations of the environment during the defined time interval tc with the pertinent situation, e.g. by using a version equivalent to the above-described pseudo-algorithm for detecting deviation.

If the user does not react in that time, the action of the adaptation system is considered as being correct.

The adaptation method of the invention is advantageously implemented with the help of a computer program executed by a processor of the central element of the adaptation system.

The adaptation system of the invention comprising the central element 8 and the sources 10, 12, 14 is self-configurable in any environment without user intervention because of the fact that the data is represented in a common format that is capable of being interpreted regardless of the sources used, thereby making the system completely open.

In addition, it is possible to administer this adaptation system remotely, e.g. from a web page.

A concrete example of an application of the invention applied to assistance in saving energy is as follows. If the adaptation system identifies regular situations of high energy consumption in a dwelling, and if it detects a particular situation corresponding to high consumption that has not previously been identified, then the central element sends a command to the appliance for monitoring energy consumption in order to warn the user by an SMS message, for example, specifying the devices that are responsible for the over-consumption.

In addition, the invention advantageously applies to fields of providing elderly or dependent people with assistance in remaining at home, and of providing comfort in residential or professional environments.

The invention claimed is:

1. A method of adapting the operation of an appliance depending on the history of its use, said appliance being connected to a network deployed in an environment of the appliance, wherein the method comprises the following steps implemented by a central element:
   collecting measurement values at at least two different instants, said measurement values relating to an environment of the appliance from a plurality of sensors;
   carrying out a data clustering technique on the collected measurement values of the at least two different instants to obtain data clusters;
   based on a result of the data clustering technique, determining a regular environment of the appliance, said data clusters being representative of the regular environment;
   receiving current measurement values from the plurality of sensors;
   determining a current environment of the appliance based on the current measurement values, said current environment corresponding to the received current measurement values;
   comparing the current environment with the regular environment relative to a threshold;
   based on the comparison, detecting a deviation between the current environment of the appliance and the regular environment of the appliance;
   in response to detecting the deviation, sending a command to the appliance to cause it to adapt its operations to the detected deviation; and
   wherein the data clustering technique includes at least one of the following algorithms: a "k-means" algorithm, an expectation maximization (EM) algorithm, and a Markov cluster algorithm (MCK), such that the centroid of each cluster that is obtained by the at least one algorithm is used to identify the regular environment.

2. The adaptation method according to claim 1, wherein the collected measurement values are represented using a single model.

3. The adaptation method according to claim 1, wherein the method includes a step of matching determined regular environments with the appliance.

4. The adaptation method according to claim 1, wherein the method further comprises:
   receiving modification data from a user for modifying the adaptation command; and
   correcting determined regular environments after receiving the modification data.

5. The adaptation method according to claim 1, wherein the method further comprises a prior step of self-configuring the central element and the sensors.

6. A system for adapting the operation of an appliance connected to a network deployed in an environment of the appliance, said system comprising a central element and a plurality of sensors wherein the central element is adapted to implement the steps of the adaptation method according to claim 1.

7. A non-transitory computer readable storage medium, with a program stored thereon, said program including instructions for implementing the method according to claim 1, when these instructions are executed by a processor.

* * * * *